Patented Oct. 25, 1927.

1,647,063

UNITED STATES PATENT OFFICE.

ERIK WILHELM TILLBERG, OF STOCKHOLM, SWEDEN, ASSIGNOR TO SIMON HELLSTRÖM, OF STOCKHOLM, SWEDEN.

METHOD OF PRODUCING BRICKS AND TILES.

No Drawing. Application filed February 17, 1927, Serial No. 169,136, and in Sweden June 9, 1926.

Clays consist in general—besides occasional constituents as for instance sand, free carbonate of lime (marly clays), sulphur pyrites, organic substances—of a plastic substance, the formula of which is considered to be $2SIO_2Al_2O_3 2H_2O$. By heating up to 300° centigrade at the lowest the water molecule, the so called hydrate water, escapes, and then the aluminic acid and the silicic acid become free. At a temperature exceeding 900° centigrade the said substances are, however, reunited, which fact is considered to provide the socalled hardening on of bricks and tiles.

The present invention has for its object a method of producing bricks and tiles which is grounded on the said observations.

For manufacturing the bricks and tiles a suitable clay is heated to a temperature at which the expelling of the hydrate water and the dissociating of the clay substance takes place, that is, to a temperature of 300° centigrade at the lowest and 900° centigrade at most, preferably, between 300° centigrade and 600° centigrade, but the heating may be interrupted before the hydrate water has been completely expelled, so that a portion of the clay is still plastic. The material treated in such a manner is then crushed and moistened with water. From the matter thus obtained raw bricks and tiles are pressed which may be burnt without being previously dried. That portion of the clay which has been deprived of its hydrate water and thereby has lost its plasticity makes the material less fat and acts as draining agent in the raw bricks and tiles, with the effect of enabling the same to be burnt without any previous treatment.

The limit of the partial decomposition varies for different clays, depending on the composition of same. So, arenarious and calciferous clays (marly clays) need not be subjected to a heating carried so far but fatter clays must be heated during a longer time. Experience has shown that the amount of plastic clay may be 5 percent at the lowest and 60 percent at most of the total amount of the material for raw bricks and tiles, in order that the same may be pressed and immediately burnt to bricks and tiles. Commonly, it is suitable to have an amount of 20 to 30 percent of plastic clay.

Having now described my invention, what I claim as new and desire to secure by Letters Patent is:

1. Method of producing bricks and tiles, characterized by the fact that a suitable clay is heated, for expelling the hydrate water and dissociating the clay substance, to a temperature of 300° centigrade at the lowest and 900° centigrade at most, depending on the nature of the clay, however, not more than that a certain amount of the plastic clay substance remains for binding the matter, which is then crushed and moistened with water and pressed to raw bricks and tiles which may then be burnt without any previous drying.

2. Method as claimed in claim 1, characterized by the fact that the heating operation is interrupted when 20 to 30 percent of plastic clay substance is left.

In witness whereof, I have hereunto signed my name.

ERIK WILHELM TILLBERG.